Feb. 26, 1952     L. M. PAGE     2,586,857
TRANSPORTATION VEHICLE

Filed July 25, 1947     4 Sheets-Sheet 1

*INVENTOR.*
L. M. PAGE
BY
ATTORNEY

Feb. 26, 1952 — L. M. PAGE — 2,586,857
TRANSPORTATION VEHICLE
Filed July 25, 1947 — 4 Sheets-Sheet 2

INVENTOR.
L. M. PAGE
BY
A. Yates Dowell
ATTORNEY

Feb. 26, 1952 L. M. PAGE 2,586,857
TRANSPORTATION VEHICLE
Filed July 25, 1947 4 Sheets-Sheet 3
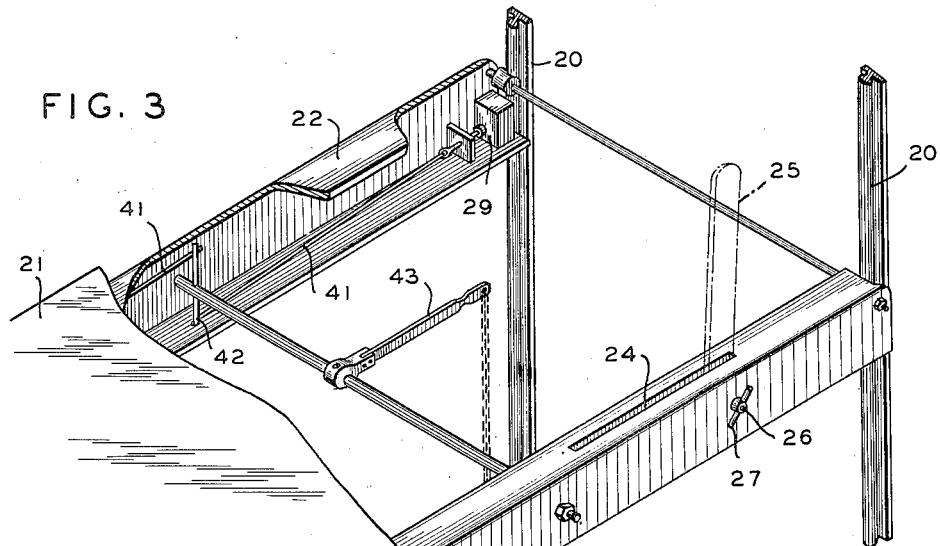
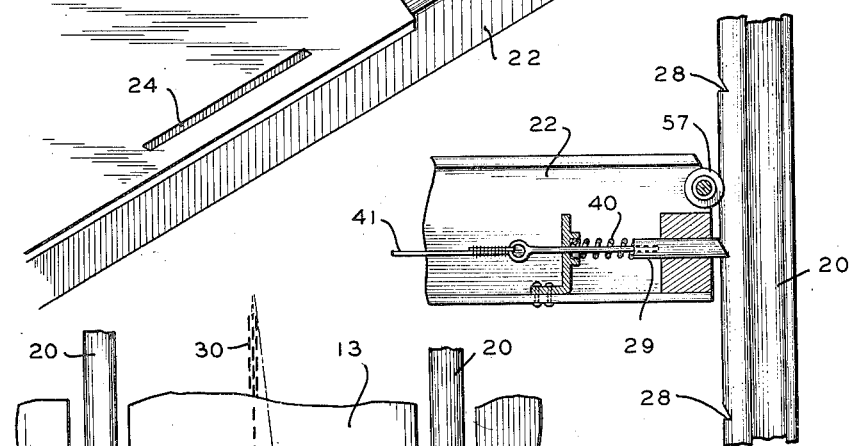
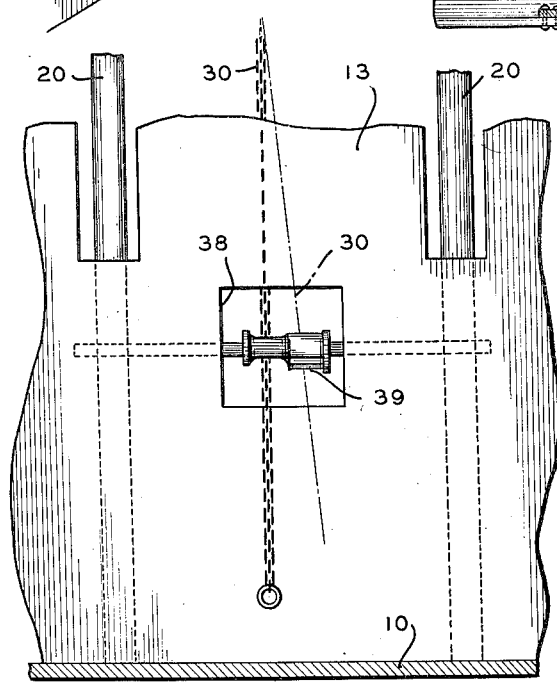
INVENTOR.
L. M. PAGE
BY A. Yates Dowell
ATTORNEY Feb. 26, 1952     L. M. PAGE     2,586,857
TRANSPORTATION VEHICLE
Filed July 25, 1947     4 Sheets-Sheet 4

INVENTOR.
L. M. PAGE
BY
A. Yates Dowell
ATTORNEY

Patented Feb. 26, 1952

2,586,857

UNITED STATES PATENT OFFICE 2,586,857

TRANSPORTATION VEHICLE

Lee M. Page, Opp, Ala., assignor of one-half to Woodfin Grady Page, Orlando, Fla.

Application July 25, 1947, Serial No. 763,472

3 Claims. (Cl. 105—371)

This invention relates to transportation, and more particularly to a transportation vehicle for the shipment of articles of commerce, such as heavy articles, hardware, furniture, glassware, or other merchandise, in freight cars, trucks, trailers, or other vehicles, regardless of the bulk, weight, or shape of the articles transported.

In the transportation of articles such as those above-mentioned, by freight or otherwise, movement of the vehicle or transporting device whether train, truck, or the like, due to impact during coupling and uncoupling of the same and starting and stopping, causes shifting of the heavy articles due to inertia, with the result that frequently lighter articles are crushed or damaged.

It is therefore desirable to anchor the articles against shifting movement and likewise to segregate the lighter articles from the heavier and arrange them in a manner to avoid as much damage as possible during shipment.

Various structures have been employed in an effort to prevent damage to merchandise in transit, including anchoring mechanisms, multiple decks and the like. These structures have not been entirely satisfactory for various reasons. They have been expensive, complicated, awkward to use, interfered with the normal use of the car, and were objectionable for other reasons.

An object of the invention is to provide a railway car or other carrier with means for the segregation of heavy articles from the lighter by the provision of a plurality of auxiliary deck sections independently controllable thereby providing greater flexibility of operation and use and reducing damage to merchandise in transit.

Another object of the invention is to provide improved car structure which is simple, inexpensive, capable of being easily produced, requiring no particular skill in the use of the same, and capable of reducing materially the normal loss in transit resulting from injury to merchandise.

Figure 1:
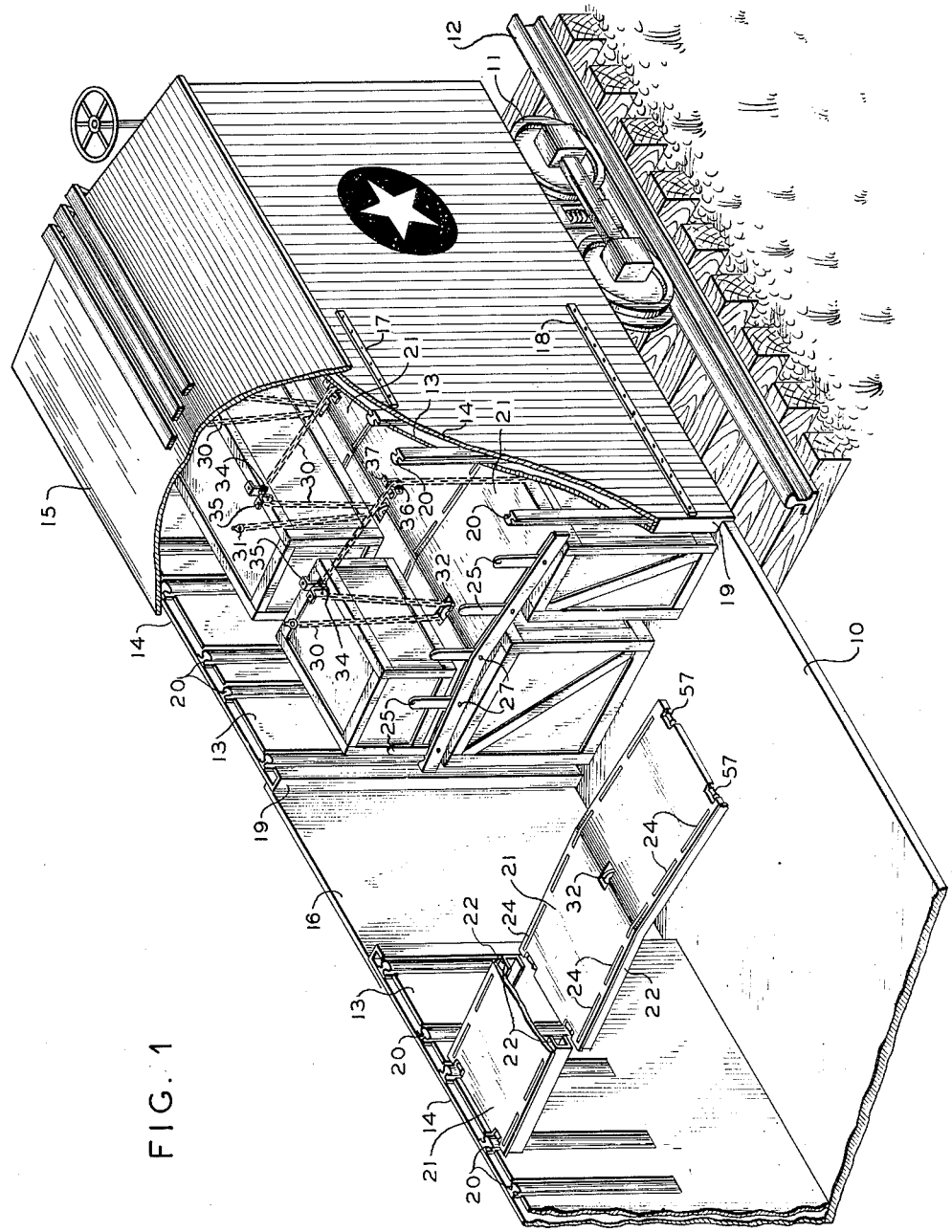
Figure 2:
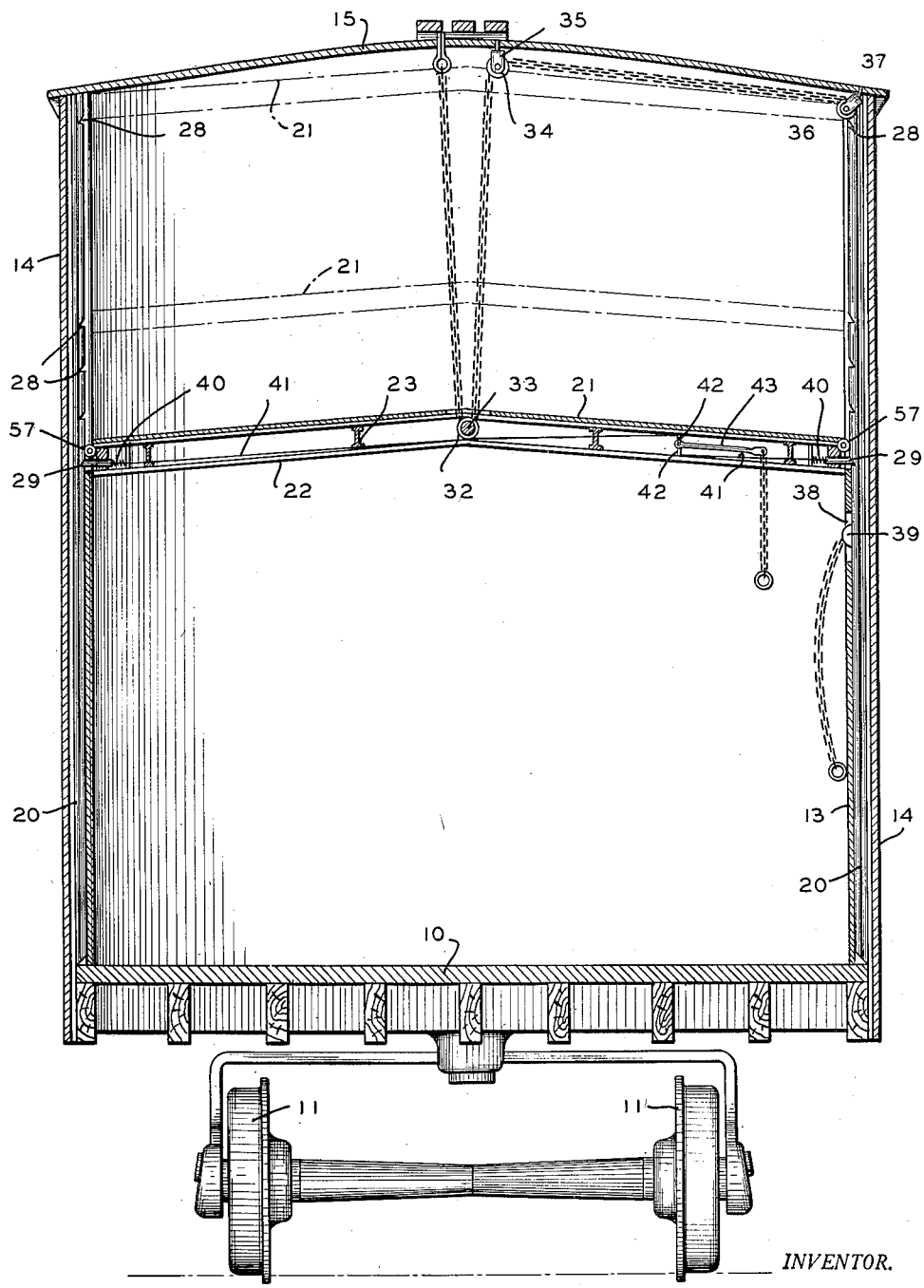
Figure 6:
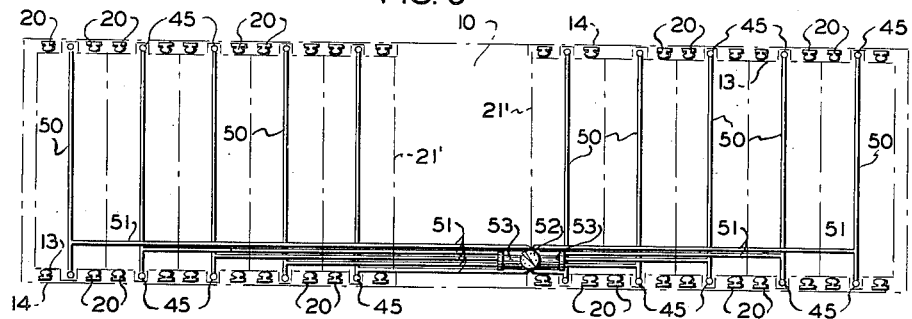
Figure 7:
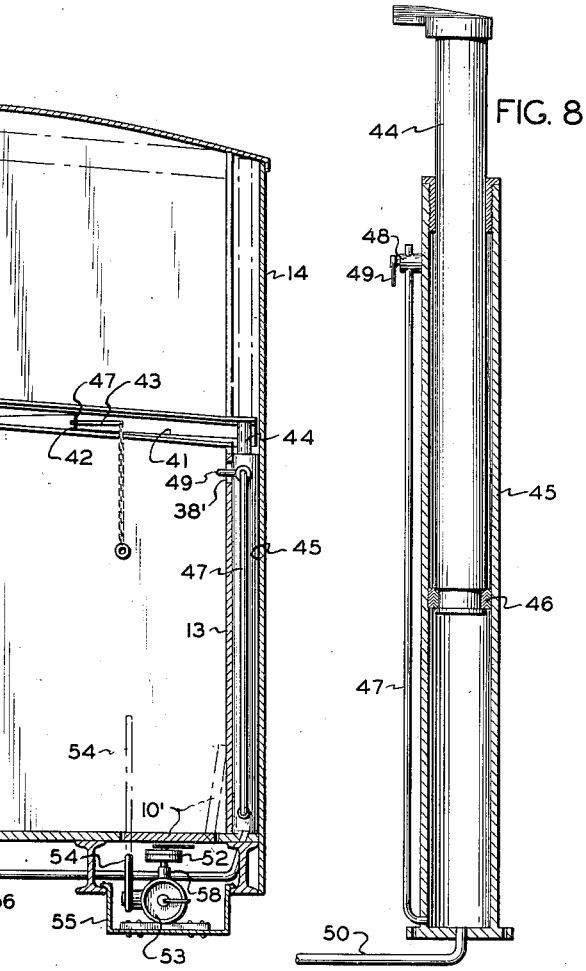
Figure 8:
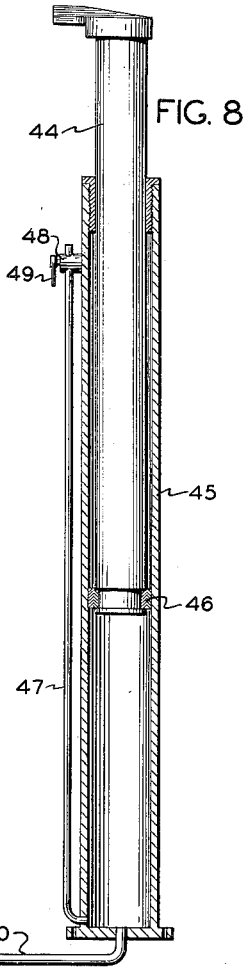

Further objects and advantages of the invention will be apparent from the following description taken in conjunction with the accompanying drawings, wherein:

Fig. 1 is a fragmentary isometric view illustrating one embodiment of the invention applied to a railway freight car;

Fig. 2, a vertical section taken through one of the deck sections of the car;

Fig. 3, a fragmentary isometric of one of the deck sections;

Fig. 4, a fragmentray detail illustrating the detent locking mechanism for the end of a deck section;

Fig. 5, a fragmentary elevation of the inner side wall of the car;

Fig. 6, a diagrammatic view of piping usable when the lift is operated by compressed air;

Fig. 7, a vertical section of a car having deck sections capable of being raised and lowered by the use of compressed air; and Fig. 8, a longitudinal detail section of one of the compressed air cylinders, and the associated piston in elevation.

Briefly stated, the preferred form of the invention comprises a container or receptacle for merchandise which may be in the form of a body employed on a truck, a railway car, or other vehicle used or intended to be employed in the transportation of articles of commerce. The body is provided with a plurality of independent vertically adjustable deck sections which may be used in alignment as a continuous deck or separately at appropriate heights for supporting lighter weight articles of various sizes and shapes at different elevations above heavier articles, and in the space that ordinarily would be wasted.

The purpose of the proposed construction is to prevent damage upon the lighter articles, caused by shifting of heavy articles while in transit. The adjustable deck sections may be raised and lowered by means of a chain hoist, by pneumatic or hydraulic means, or by any other desired means, such deck sections being preferably slightly inclined downwardly from their centers to their ends for strength, and in order that they may be raised to the greatest elevation within the body.

With continued reference to the drawings, embodiments of the invention may be applied to various types of vehicles including those of the character employed by public carriers either truck, freight car or the like, all of which have a body which forms a receptacle or container for the merchandise that is transported. In the present instance a railway freight car is disclosed having a floor 10 supported by wheels 11 on a track 12.

The car is also provided with spaced inner and outer walls 13 and 14 forming the sides and ends of the car and with a top or roof 15. Slidable doors 16 are mounted by rollers (not shown) on upper and lower tracks 17 and 18 and these doors are adapted to close doorways 19. The inner and outer side walls 13 and 14 are provided with reinforcing rail members or uprights 20. The inner walls 13 are slotted adjacent the uprights to allow the rollers 57 and the detents 29 to engage the uprights for guiding the deck section and retaining the deck section in adjusted position.

The structure just described represents a conventional freight car of wood, steel or other construction, which is designed to be loaded through the doorway 19.

Shifting of heavy articles has caused substantial damage in cars of this kind and in order to reduce loss by such damage, a car of the character described may be provided with a plurality of vertically adjustable deck sections 21, which at each side of the door will form a continuous deck when they are in the same horizontal position but which are adapted to be disposed at appropriate heights for the desired use in order to support lighter weight or breakable articles of varying sizes and at different elevations above heavy articles resting on the floor of the car.

Each deck section 21 tapers slightly from its center towards its ends, forming an inverted V of relatively large angle, in order to conform to the angularity of the top of the car. Each deck section has at its sides longitudinal channels or other reinforcing members 22. Extending between and secured to the longitudinal channel members 22 are transverse cross bars 23 in order to provide a substantial rigid construction. Due to the inverted V-shape or arch-shaped construction of the deck sections a supporting means at the center such as chain 30 will support the section in a substantially horizontal position since the center of gravity of the section is below the point of support. Further, due to the arch-shape of the deck section any deformation of the deck due to bending when the deck is supported by detents 29 would tend to straighten out the deck pressing the ends of the deck section into more secure engagement with the uprights thereby making the deck more stable.

Slots 24 provided in the tops of each deck section parallel to the longitudinal channels 22 receive pivoted bars or gates 25 to permit them to be disposed either in concealed position or in upright position wherein they provide abutments to prevent articles on the particular deck section from sliding or topping off the section. The gate members 25 are mounted on pivots 26 operated by manipulating portions or thumb screws 27.

The uprights or reinforcing rails 20 are provided with notches 28 for engagement by retractable spring pressed or loaded detents 29 in each end of the deck section.

Each deck section 21 is adapted to be supported from the top and sides of the car. In order to accomplish this a chain 30 has one end anchored in an eye bolt 31 fixed at the top of the car. This chain extends around a pulley 32 supported on a shaft 33 at the center of the deck section 21. The chain 30 also extends around a pulley 34 carried by a bracket 35 attached to the roof 15 of the car, around another pulley 36 carried by a bracket 37 also attached to the roof of the car, and between the inner and outer walls 13 and 14 of the car downwardly to a position below the vertical operating range or lowermost position of the deck where it is exposed by an opening 38 by means of which the chain may be engaged and manipulated. The chain is preferably provided with a locking device 39 at the level of the opening 38 so that the deck may be held at the top of the car near the roof.

When the chain 30 is pulled, the detents 29 will be released due to the taper of the notches 28 in which they are located and the corresponding taper at the end of the detent and the deck will be raised. In the lowering of the device the detents will normally automatically engage the notches. In order to permit the deck sections to move downwardly without the detents engaging the notches the detents are retracted against the action of the springs 40 by means of cables 41 engaging arms 42 of bell crank levers 43. When the levers are swung the arms will be operated to pull the cables to retract the detents.

Instead of providing a chain hoist for raising and lowering the deck sections other means may be employed as, for example, a compressed air hoist or the like.

As shown in Fig. 7, the deck sections 21' are adapted to be raised and lowered by means of a pair of pistons 44 operating in vertical cylinders 45, the lower end of each piston being provided with a piston ring or gasket 46, so that full effect of the fluid in the cylinder beneath the piston can be employed. Air is adapted to be released from the cylinder for lowering the deck sections through a tube 47 and a relief valve 48, the tube and relief valve being located between the walls 13 and 14 of the car, with the relief valve provided with a handle 49 extending into a readily accessible position through a slot 38' in the inner wall 13.

Air is introduced into the lower end of the cylinder 45 through a pipe 50, such pipe forming a connection between each opposed pair of cylinders, as shown in Fig. 6, and being supplied with air through a pipe 51 from a selector valve 52 supplied through a check valve 58 from a double-action compressor 53. The compressor or pump 53 is operated by a lever 54 accessible by means of a pivoted trap door 10' in the floor of the car. When the trap door is in closed position, it will conceal the pump handle but will allow the pump handle to be elevated and operated when the door is open, as shown in dotted lines in Fig. 7. With the construction shown in Fig. 7, pneumatic operation of the deck sections is possible. The pump 53 is suspended or supported by means of a U-shaped member 55 from the longitudinal I beams 56, which support the floor of the structure.

If desired, the ends of the deck sections may be provided with anti-friction rail-engaging means in the form of concave rollers 57 which engage uprights 20.

Each of the sections can be adapted to be used as a stop, by stepping the same, and in some cases, serve to hold an odd size crate in the lower portion of the car from toppling over, thereby eliminating the necessity of shoring or individually anchoring the crate.

The construction above described makes possible the packing of furniture and other articles so that they can be easily, safely and inexpensively transported.

It will be obvious to those skilled in the art that various changes may be made in the described embodiments without departing from the spirit and scope of the invention and therefore the invention is not limited by that which is shown in the drawings and described in the specification but only as indicated in the appended claims.

What is claimed is:

1. A vehicle having a floor, side walls, a roof and uprights disposed in spaced relation and reinforcing said side walls, a deck for said vehicle comprising a horizontally disposed deck section of generally inverted V-shape positioned between said side walls and mounted for vertical movement, means to support the deck section in a substantially horizontal position and to move said deck section vertically, including a flexible member connected to said deck section substantially midway between the side walls above the center of gravity of the deck section, means to move said flexible member vertically to move the connected deck section to a desired position of adjustment, and means at the ends of said deck section for engagement with the uprights for retaining said deck section in adjusted position.

2. A vehicle having a floor, side walls, a roof and uprights disposed in spaced relation and reinforcing said side walls, a deck for said vehicle comprising a horizontally disposed deck section of generally inverted V-shape positioned between said side walls and mounted for vertical movement, means to support the deck section in a substantially horizontal position and to move said deck section vertically, including a pulley mounted on said deck section above the center of gravity of the section and below the top surface thereof, a flexible member secured at one end to the top of the vehicle and passing under said pulley and upwardly therefrom, and means to produce an upward pull on said unfastened upwardly extending portion of said flexible member whereby the deck section may be raised or lowered, and means to secure said other end of said flexible member in a fixed position of adjustment, and means at the ends of said deck section for engagement with the uprights for retaining said deck section in adjusted position.

3. A vehicle having a floor, side walls, a roof and uprights disposed in spaced relation and reinforcing said side walls, a deck for said vehicle comprising a horizontally disposed deck section of generally inverted V-shape positioned between said side walls and mounted for vertical movement, means to support the deck section in a substantially horizontal position and to move said deck section vertically, including a flexible member connected to said deck section substantially midway between the side walls above the center of gravity of the deck section, means to move said flexible member vertically to move the connected deck section to a desired position of adjustment, means at the ends of said deck section for engagement with the uprights for retaining said deck section in adjusted position, and stakes carried by said deck section mounted for movement from an inoperative position below the deck surface to an operative position extending upwardly from the surface for retaining cargo thereon.

LEE M. PAGE.

REFERENCES CITED

The following references are of record in the file of this patent:

UNITED STATES PATENTS

| Number | Name | Date |
|---|---|---|
| 253,418 | Oehrl | Feb. 7, 1882 |
| 681,434 | Bayless | Aug. 27, 1901 |
| 753,643 | Spier | Mar. 1, 1904 |
| 778,337 | Smiley | Dec. 27, 1904 |
| 896,466 | Ross | Aug. 18, 1908 |
| 1,205,674 | Shelton | Nov. 21, 1916 |
| 1,229,374 | Youngblood | June 12, 1917 |
| 1,246,467 | Rember | Nov. 13, 1917 |
| 1,282,764 | Daly | Oct. 29, 1918 |
| 1,706,211 | Coffey | Mar. 19, 1929 |
| 1,772,848 | Walsh | Aug. 12, 1930 |
| 2,137,979 | Cooper | Nov. 22, 1938 |